(12) United States Patent
Ransom et al.

(10) Patent No.: US 9,281,559 B2
(45) Date of Patent: Mar. 8, 2016

(54) METHOD FOR DIRECTED ANTENNA ALIGNMENT THROUGH AUGMENTED REALITY

(75) Inventors: Nathan Ransom, Rochester, NY (US); Myung Lee, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 962 days.

(21) Appl. No.: 13/306,482

(22) Filed: Nov. 29, 2011

(65) Prior Publication Data
US 2013/0135146 A1 May 30, 2013

(51) Int. Cl.
*H01Q 3/00* (2006.01)
*G01S 19/23* (2010.01)

(52) U.S. Cl.
CPC .............. *H01Q 3/005* (2013.01); *G01S 19/23* (2013.01)

(58) Field of Classification Search
IPC ............................................ H01Q 1/125,3/005
See application file for complete search history.

(56) References Cited

U.S. PATENT DOCUMENTS

| | | | | |
|---|---|---|---|---|
| 5,390,125 A * | 2/1995 | Sennott | ............... | B60K 31/0008 342/357.24 |
| 7,577,316 B2 * | 8/2009 | Di Bernardo et al. | ........ | 382/305 |
| 2003/0025791 A1 * | 2/2003 | Kaylor | ............. | G08B 13/19628 348/143 |
| 2008/0258986 A1 * | 10/2008 | Milbrandt et al. | ............ | 343/757 |
| 2008/0284669 A1 * | 11/2008 | Hunton | .................... | H01Q 1/22 343/757 |
| 2009/0033576 A1 * | 2/2009 | Smoyer et al. | ................ | 343/761 |
| 2010/0201571 A1 * | 8/2010 | Guzman | ....................... | 342/359 |

OTHER PUBLICATIONS

SatHunter. Manual [online]. 200-[retrieved on Sep. 15, 2014]. Retrieved from the Internet: <URL: http://sathunter.com/index.php>.*
Installation Manual DIRECTV Multi-Satellite Dish Antenna with Integrated Triple LNB and Built-in Multi-Switch, DIRECTV, p. 1-12, Apr. 17, 2003.*
Output device. (2006). In High definition: A-Z Guide to personal technology. Boston, MA: Houghton Mifflin. Retrieved from http://search.credoreference.com/content/entry/hmhighdef/output_device/0.*
H. Abbott et al., Land-vehicle navigation using GPS, Proceedings of the IEEE, vol. 87(1), p. 145-162, 1999.*

* cited by examiner

*Primary Examiner* — Tashiana Adams
*Assistant Examiner* — Fred H Mull
(74) *Attorney, Agent, or Firm* — Fox Rothschild, LLP; Robert J. Sacco; Carol E. Thorstad-Forsyth (57) ABSTRACT

A system for aligning two ground-based antennae (100, 110) or a ground-based antenna (100) and a satellite antenna (110), for use in military and civilian settings, in which a visual display is generated showing a graphical representation of the antennae including graphical representations indicating both the axis of the main lobe (102) and the approximate radiation pattern (414) of the antennae, superimposed over a live imaging of the local terrain. The alignment is achieved when the graphical representations of the main axis and radiation patterns of the two antennae align with each other.

20 Claims, 6 Drawing Sheets

METHOD FOR DIRECTED ANTENNA ALIGNMENT THROUGH AUGMENTED REALITY

BACKGROUND OF THE INVENTION

1. Statement of the Technical Field

The invention is relevant to the field of antennas, and, in particular, to methods of aligning antennas to a particular target, both in commercial and military settings.

2. Description of the Related Art

Currently, antennas in the field, both for military and for commercial applications, must be manually aligned. This involves a process of sending a "ping" to the target antenna and listening for a response transmission. This process is repeated until the antenna is positioned where the signal strength of the transmission from the target transmitter is highest. Likewise, if the target transmitter is a satellite that is continuously transmitting, such as a satellite used for the transmission of satellite television signals, the antenna is pointed in the general direction of the satellite and its position fine-tuned using a signal strength meter. The antenna is usually considered to be aligned when pointed in a direction that results in the highest signal strength being received from the target transmitter.

Auto-pointing antennas are also available, but currently work on the same principle of changing the antenna position until the greatest signal strength is measured for signals received from the target. Auto-pointing antenna systems generally tend to be used in larger systems, such as those which are mounted in military or commercial vehicles.

Because communications satellites are typically in geosynchronous orbit, aligning an antenna to a satellite involves calculating the azimuth (side-to-side) and elevation (up-down) angles of the satellite. Once this information has been determined, the antenna position can be adjusted so that the boresight of the antenna is aligned with the particular satellite. The azimuth and elevation angles needed to align the antenna are dependent on the latitude and longitude of the antenna and the particular satellite that the dish needs to point to. As positions of satellites with respect to the Earth are known, there are software programs readily available that will calculate the azimuth and elevation angles for a particular satellite, given the latitude and longitude of a terrestrial antenna. These software programs can provide a rough azimuth and elevation angle needed for positioning of the antenna. The positioning of the antenna can then be fine-tuned using the signal strength method described above.

The process for aligning two land-based antennas is similar to the process used for aligning a terrestrial antenna with a satellite. The approximate location of the target antenna must be known with respect to the current position of the local antenna being aligned. Because antenna alignment requires line-of-sight, it is often possible to obtain a rough alignment of a terrestrial target antenna by actually sighting the target antenna. The alignment can then be fine-tuned using the signal strength method.

One drawback of the current method of aligning antennas, particularly in a military setting, is that alignment requires a signal to be sent to the target satellite or target ground-based antenna. In certain situations, a signal may also be sent by the target antenna to the local antenna which is being aligned. This process may give away the position of one or both of the antennas involved in the alignment process, even before any substantive transmission takes place. In situations where it is desirable to remain covert, this can be a distinct disadvantage.

SUMMARY OF THE INVENTION

The invention concerns a system for aligning antennae. The system includes a processor and a positioning system coupled to the processor. The processor is programmed for determining a position and an orientation (e.g., azimuth and elevation) of a local antenna. A visual display is coupled to the processor, and the processor is configured for generating a graphical user interface. The graphical user interface includes indicia comprising graphical elements which indicate a relative position of the local antenna and a target antenna. The indicia also include graphical elements that show the axis of the main lobe of the radiation pattern of the local antenna. The foregoing arrangement provides an augmented reality display which can show the direction that a local antenna needs to point to so that is aligned to a target antenna. In particular, the display can show the positions of the local antenna and the target antenna (a satellite or ground-based antenna) with indicia representing the direction of transmissions from that antenna in accordance with a boresight aligned with the main lobe of the local antenna. The indicia are superimposed over a real time view of the terrain in the area in which the local antenna is situated. All that is then required for alignment of the local antenna to the target antenna is to physically move the local antenna to align the graphical elements specifying a boresight of the local antenna with the indicia specifying a position of the target antenna.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
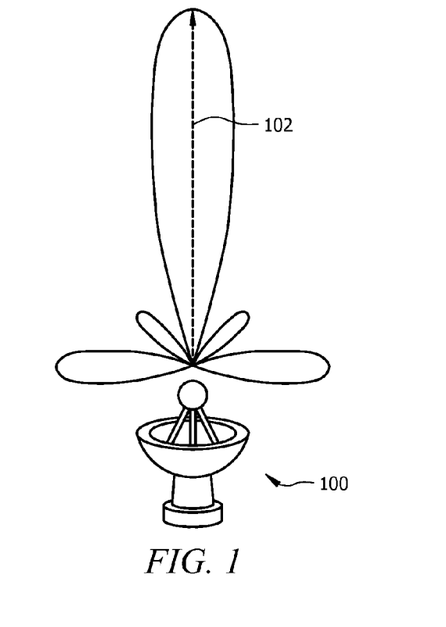
FIG. 1 shows the antenna radiation pattern of a typical directional antenna.
Figure 2:
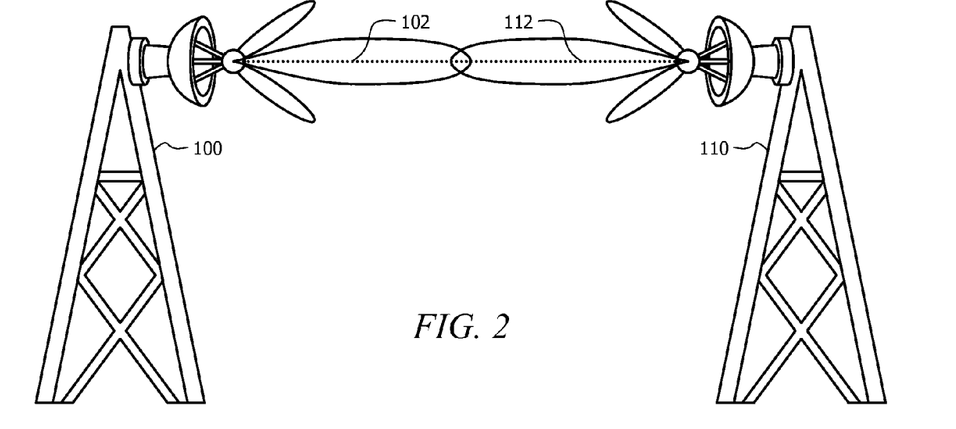
FIG. 2 shows the alignment of two ground based antennas.
Figure 3:
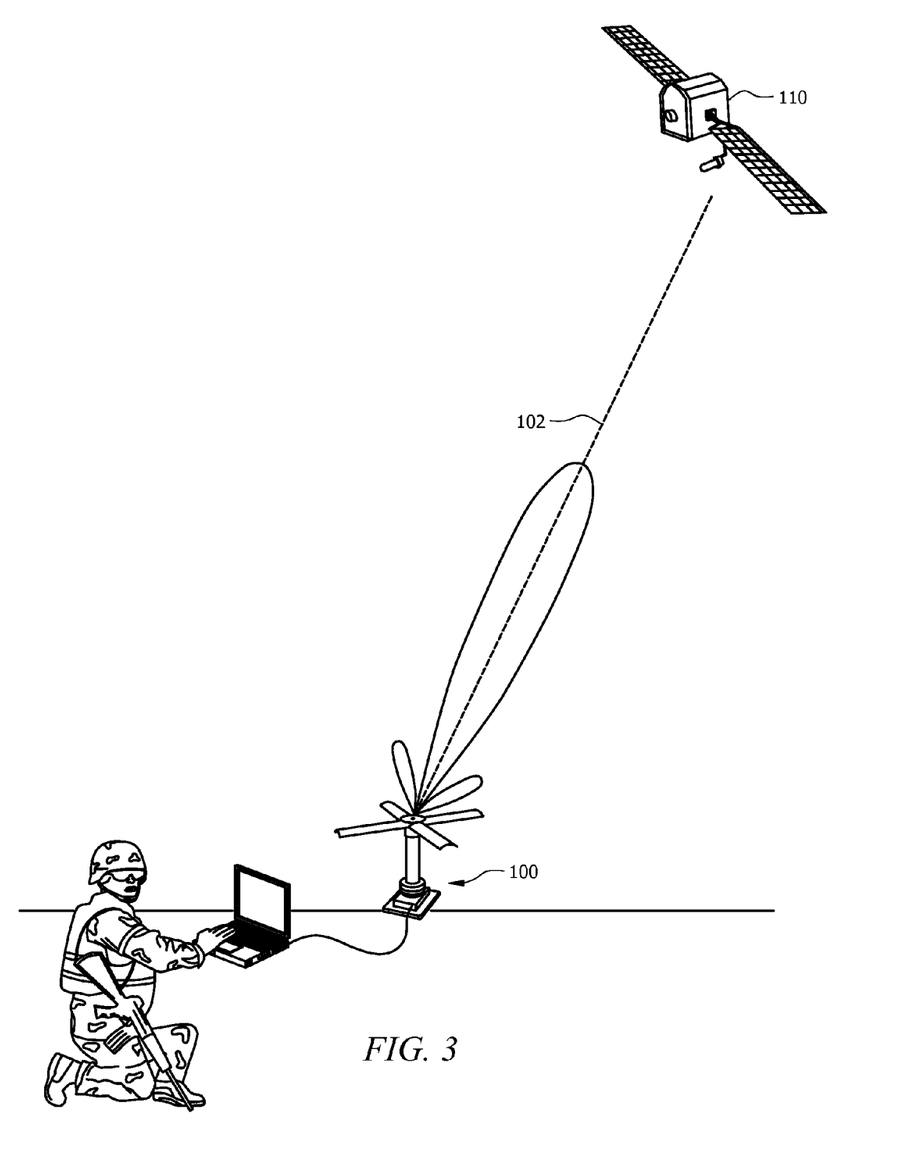
FIG. 3 shows the alignment of a ground based antenna with a satellite in geosynchronous orbit.

FIG. 1 shows a typical antenna radiation pattern produced by a directional antenna. The main lobe 102 of the antenna radiation pattern represents the axis of maximum gain. The objective when aligning antennas and, in particular, two ground based antennas, is to align the boresight or the axis of the main lobe of both the local and the remote antennas. This concept is shown in FIG. 2. To have antennas 100 and 110 aligned with each other, ideally the axis of the main lobe 102 of antenna 100 and the axis of the main lobe 112 of antenna 110 would be in alignment with each other. The same principle applies in FIG. 3 where a portable directional antenna is shown being aligned with a satellite in geosynchronous orbit having an antenna 110. Although the radiation pattern of the satellite is not shown, it is a similar radiation pattern to the radiation pattern of the directional antenna on the ground.

Figure 8:
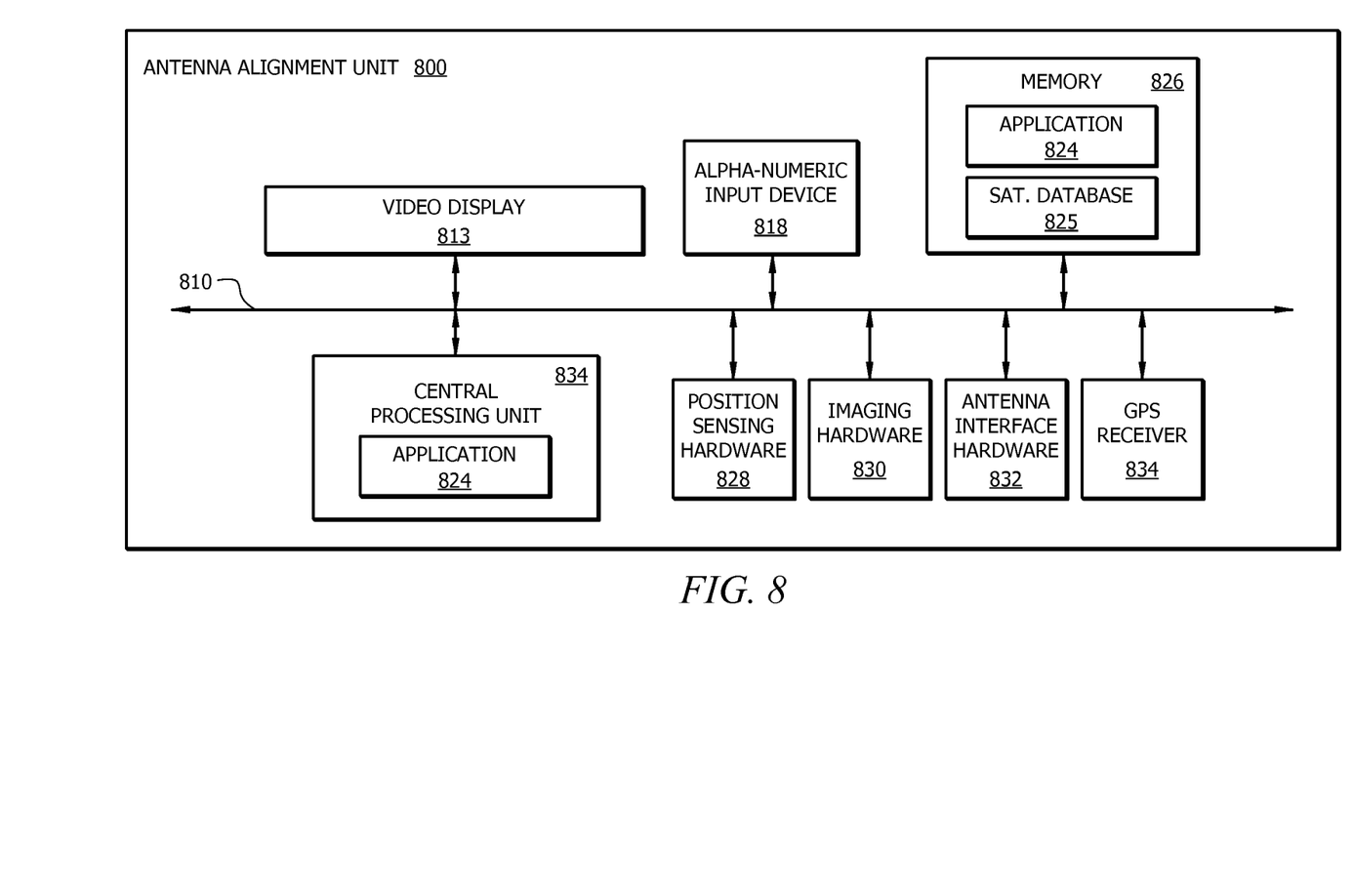
FIG. 8 is a schematic diagram of the hardware platform required for the present invention.

An exemplary embodiment of a hardware platform used for implementing the invention is shown in schematic form in FIG. 8. The hardware platform is identified as an antenna alignment unit 800 and consists of a portable computing device equipped with standard components for the storage and execution of one or more computer software applications. A computer readable storage medium, such as memory 826, is used for the permanent storage of application instructions 824 and the satellite location database 825. Memory 826 is a solid state flash memory, a disk drive or any other suitable data storage device. Central processing unit 834 executes application instructions 824 and accesses data from other components of the system through a communication channel 810. The antenna alignment unit 800 is preferably equipped with a video display 813 and alphanumeric input device 818, which may be a separate keyboard or a virtual keyboard accessible through video display 813.

In addition, the antenna alignment unit 800 is equipped with several additional components to enable the execution of the application. Position sensing hardware 828, is provided and configured to detect an azimuth and elevation angle of the local directional antenna to facilitate the antenna alignment process. Imaging hardware 830, preferably in the form of a video camera, is provided for generating a video source signal suitable for display on the video display 813. The combination of the video camera and the display unit can provide a view of the surrounding terrain. Necessary graphics and other information is advantageously superimposed on a background image comprising the surrounding terrain, as will be described below. The antenna alignment unit 800 can be equipped with a GPS receiver 822 for determining the unit's position, in standard latitude and longitude coordinates. Still, it should be understood that a GPS unit is not required for implementing the present invention, and information concerning the position of the local antenna may also be manually entered by the user via alphanumeric input device 818. Lastly, antenna interface hardware 832 is preferably arranged so that the antenna alignment unit can send signals through the local antenna to the remote antenna. Such signals can advantageously include information specifying the GPS coordinates of the local antenna as well as its pointing status, and to receive this same information from the remote antenna. Although not shown in FIG. 8, it should be appreciated that the apparatus for implementing the present invention can also include a local antenna which is to be aligned.

It is not necessary that all components of antenna alignment unit 800 be housed in the same unit or located in the same place. For example, position sensing hardware 828, must, of necessity, be located on the local antenna or its associated support structure. Such an arrangement facilitates direct sensing of the movement and orientation of the local antenna so that this information can be monitored by the antenna alignment unit 800 as the user moves the antenna during the alignment process. In addition, imaging hardware 830 will also preferably be located on the local antenna or its associated support structure. Such an arrangement can ensure that imaging hardware 830 is positioned to capture images in a direction aligned with the boresight orientation of the local antenna. The captured imagery is thereafter used to provide a view to the user of the actual terrain with respect to the radiation pattern of the antenna. The remainder of the components in antenna alignment unit 800 may be located remotely from the antenna. For instance, it may be convenient for video display 813 to be located apart from the local antenna so as to facilitate viewing of the display by the user.

Dedicated hardware implementations of the antenna alignment unit 800 can include, but are not limited to, application-specific integrated circuits, programmable logic arrays, and other hardware devices which are constructed to implement the methods described herein. Various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium embodied as memory 826 is shown in FIG. 8 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape. Accordingly, the disclosure is considered to include a computer-readable medium and to include recognized equivalents and successor media, in which the software implementations herein are stored.

There are two modes of operation for the device. The first mode facilitates the alignment of the local antenna with a ground based target antenna. In this case, the antenna alignment unit 800 must be provided with information specifying the location of the local antenna and the target to facilitate calculating a relative bearing and elevation to which the local antenna must be adjusted. Therefore, in this embodiment of the invention, the GPS coordinates (latitude and longitude) and pointing status (i.e., which direction the antenna is pointed) of each antenna is transmitted to the other antenna. As the antennae are not aligned at this point, transmission of this information to the other antenna is accomplished via an alternate means of communication, such as WiFi, 3G cellular or any other point-to-point link which does not require transmitting information using the antenna being aligned.

The second mode of operation is the alignment of the antenna with a satellite in geosynchronous orbit. In this case, the antenna alignment unit 800 would determine the position of its local antenna (e.g., by using a GPS receiver). The location of all geosynchronous satellites is well known and such information can therefore be stored in the satellite database 825, or input by the operator via the alphanumeric input device 818. By using the GPS location of the local antenna and the known position of the geosynchronous satellite, application 824 is able to calculate the relative bearing and elevation to the satellite.

Figure 4:
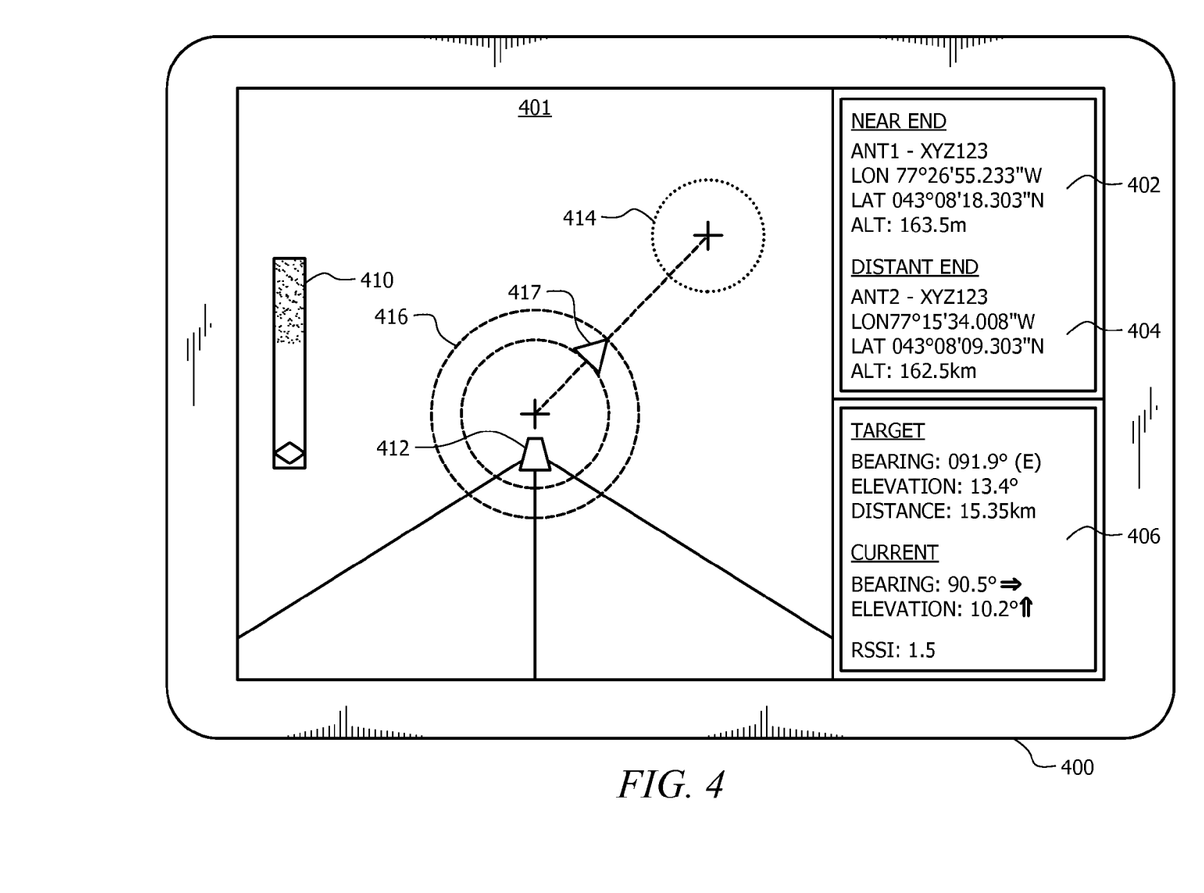
FIG. 4 is a sample display for aligning two ground based antenna.

Referring now to FIG. 4, there is shown a screen display of a graphical interface 400. The graphical interface 400 can be presented on the video display 813 described above in reference to FIG. 8. The graphical interface 400 is presented to an operator of the antenna alignment unit 800 when utilizing the ground-to-ground antenna alignment mode. The main area 401 of the graphical interface shows the representation of the local antenna 412 and a representation of the radiation pattern 414 of the target antenna. Radiation pattern 414 is meant to indicate the "half power beam" region of the antenna, which, when shown means that the antennas are directly aligned. When the antennas are aligned, the radiation pattern 414 of the target antenna would look similar to the radiation pattern 416 of local antenna 412, indicating a full strength signal. The indicated radiation patterns are approximations based on the relative positions of the antennae, and any graphic symbol may be used to indicate the approximate power of the antenna.

Also provided is a graphic element 416 including a pointer 417 which serves as an aid for pointing the local antenna. Signal strength meter 410 shows the strength of the signal received from the target antenna. In the area to the right of the main area 401 is data which will assist the user in aligning the antenna. Location information 402 shows the location of the local antenna, including the antenna's name, it's latitude and longitude and its altitude. Location information 404 shows similar data for the target antenna 404. Alignment aid information 406 includes several types of information that are useful to assist the user in aligning the local antenna with the target antenna. In particular, the alignment aid information 406 includes bearing, elevation and distance to the target antenna. The alignment aid information 406 also includes the current bearing and elevation of the local antenna. As the user moves the local antenna, alignment aid information 406 will change to show the current bearing and elevation information of the local antenna.

When the antennas are aligned, the dotted circles representing the radiation patterns of the respective antennae will be concentric, with the two crosses representing the boresights of the antennae being on top of each other. As the crosses get closer, the dotted circles 414 and 416 will intersect each other, indicating imminent alignment. Optionally, the intersection of the two patterns may be highlighted, which will result in a highlighted circular region when the crosses completely overlap, indicating alignment. In addition, there may be other textual cues that the antennae are aligned.

Figure 5:
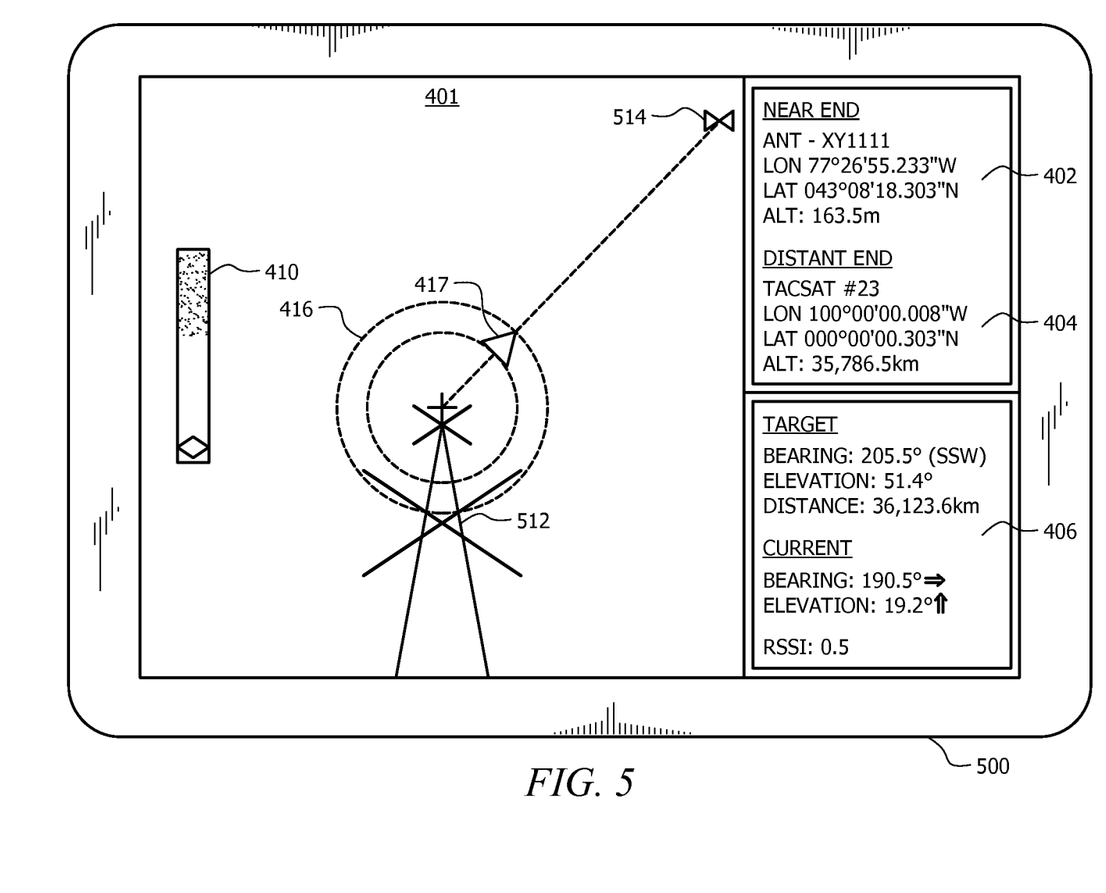
FIG. 5 is a sample display for aligning a ground based antenna with a satellite in geosynchronous orbit.

Referring now to FIG. 5, there is provided a graphical interface 500 that is similar to graphical interface 400, but configured for the second mode of operation in which the local antenna is being aligned with a satellite in geosynchronous orbit. Note that in FIG. 5, the graphic indicating the location of the target antenna has been replaced with a graphic 514 showing a satellite and its approximate location with respect to the local antenna. In addition, the graphic representation of the local antenna 512 is also changed to indicate the nature of the local antenna. All other information in graphical interface 500 is substantially similar to the information presented in graphical interface 400. In some embodiments of the invention, the antenna alignment unit 800 can be provided with information concerning the type of antenna being used so that the design of the graphic element 412, 512 corresponds to the actual appearance of the antenna being used in a particular situation. The information identifying the particular type of antenna in use can be manually entered by a user or can be automatically sensed by the antenna alignment unit. Techniques for automatically detecting an antenna can include detecting an impedance of the local antenna, or any other unique characteristic associated with the local antenna.

In graphic interfaces 400, 500 a live video image of the surrounding terrain can be displayed in the background of the main area 401 or 501. This live video is preferably provided by imaging hardware 530. The resulting graphic interfaces 400, 500 will have the graphic representations of the target antenna and the local antenna superimposed over the live video image of the surrounding terrain. Preferably, imaging hardware 530 will be attached to a portion of the local antenna or its support structure so that it captures a video image that is aligned with the axis of the main lobe of the radiation pattern for the local antenna. With the foregoing arrangement, the view of the terrain that is displayed in graphic interface 400, 500 approximates a visualization of the actual direction that the antenna is pointed.

Figure 6:
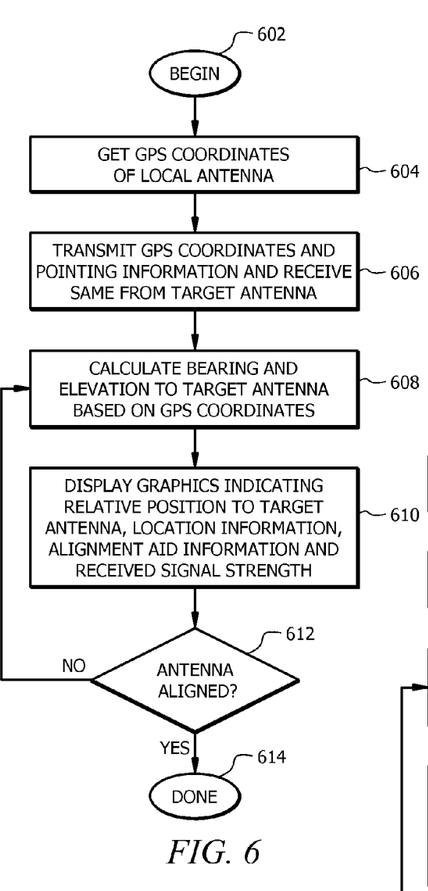
FIG. 6 is a flow chart showing the alignment procedure for aligning two ground based antennas.

FIG. 6 shows the flow of processing of instructions associated with application 824. The process begins at 602 and continues at step 604. In step 604, the application obtains the coordinates of the local antenna. This step can be performed by manually receiving location data by means of the alphanumeric input device 818, but preferably involves utilizing GPS receiver 834 to obtain the GPS coordinates. In step 606, the GPS coordinates and pointing status of the local antenna are transmitted to the target antenna. The target antenna responds by transmitting its GPS coordinates and pointing status back to the local antenna. As used herein, the phrase "pointing status" refers to the current azimuth and elevation angle of the local antenna. In step 608, application 824 calculates the bearing and elevation to the target antenna based on the known GPS coordinates of both the local antenna and the target antenna. At step 610, the graphical interface 400 is updated to indicate the relative bearing to the target antenna, and the current bearing information of the local antenna. The location information 402, 404 for the local antenna and the target antenna are displayed as well as the alignment aid information 406 and the signal strength 410. At decision point 612, as the user moves the local antenna according to the alignment aid information 506, and with the aid of graphic interface 400, a check is made to see if the antenna is aligned, and, if not, processing returns to step 608 where a new relative bearing and elevation to the target antenna is calculated. The newly calculated information is displayed at step 610 and the process repeats until the antenna is aligned, at which time processing stops at step 614.

Figure 7:
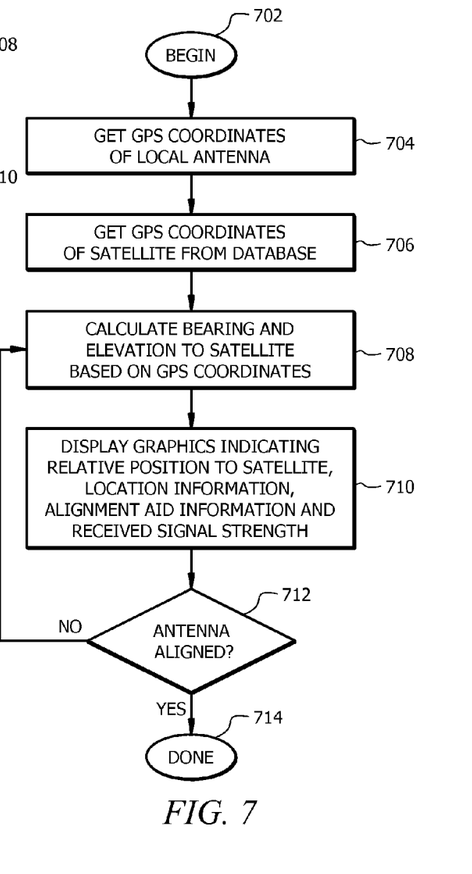
FIG. 7 is a flow chart showing the procedure for aligning a ground based antenna with a satellite in geosynchronous orbit.

FIG. 7 shows a flow of processing similar to the processing in FIG. 7, but for the mode where the local antenna is being aligned to a satellite in geosynchronous orbit. The main difference occurs at step 706 where, instead of receiving the GPS coordinates of the target antenna (i.e., the satellite) from the satellite itself, those coordinates are retrieved from a database of known coordinates of satellites. Other than that, the processing is substantially similar to the case where the local antenna is being aligned to another ground based antenna.

Note that the graphical interface displays shown in FIGS. 4 and 5 are exemplary in nature only and are not meant to limit the scope of the invention. Various other arrangements of information and graphical displays may be utilized and still be within the spirit of the invention. The application 824 can be run on any suitable hardware platform 800, including for example a laptop, a smart phone or a tablet computing device. In the preferred embodiment of the invention, video display 813 will be located remotely from the local antenna to facilitate viewing the screen as the antenna is rotated. However, it is preferred that the position-sensing hardware 828 and the imaging hardware 830 are located physically on the antenna or its associated support structure. This ensures that as the antenna is rotated, the orientation of the antenna in space is detected by the position-sensing hardware such as to allow updating of the display.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A system for aligning antennae, comprising:
a hardware platform including
a computing device comprised of a processor that performs operations and accesses data from other components of the hardware platform,
a GPS receiver configured to determine a geographic location of a local antenna,
a position sensing hardware component disposed at the local antenna to detect a pointing status of the local antenna, including an azimuth and elevation angle of the local antenna;
an imaging device that provides a live video image of local terrain in which said local antenna is situated, the imaging device aligned to provide the live video image along a boresight direction of the local antenna which coincides with a main lobe of the local antenna;
a video display device responsive to the computing device to display a graphical user interface overlaid on the live video image; and
a communication channel which facilitates data communication between the computing device, the GPS receiver, the imaging device, the video display device and the position sensing hardware component;
wherein the computing device is configured to
receive the pointing status of the local antenna determined by the position sensing hardware component under conditions in which the local antenna is not currently aligned with a target antenna, receive the geographic location of the local antenna determined by the GPS receiver, cause first information specifying the geographic location and the pointing status of the local antenna to be communicated to the target antenna via communications equipment other than the local and target antennas,
access second information specifying a geographic location and pointing status of the target terminal, where the second information was communicated from the target antenna to the local antenna responsive to the first information and using the communications equipment other than the local and target antennas,
determine a relative bearing and elevation to which the local antenna should be adjusted to become aligned with the target antenna based on the first and second information,
use the first and second information to generate the graphical user interface, and
cause the graphical user interface to be updated and displayed on the video display device, superimposed on the live video image; and
wherein the graphical user interface is comprised of a concurrent representation of a first graphical element comprised of a first radiation pattern of the local antenna, and a second graphical element comprised of a second radiation pattern of the target antenna, the concurrent representation graphically illustrating a relative alignment of a main lobe of the first radiation pattern with a main lobe of the second radiation pattern.

2. The system of claim 1, wherein said graphical user interface includes indicia which specifies said relative bearing and elevation.

3. The system of claim 2, wherein said computing device is further configured to automatically update a position of said indicia contained in said video display device as the azimuth and elevation orientation of said local antenna is changed.

4. The system of claim 1, wherein said imaging device is secured to said local antenna or a portion of a support structure for said local antenna aligned with the boresight direction.

5. The system of claim 1, wherein the hardware platform further comprises an alphanumeric input device configured to facilitate manual input of position data concerning the position of said local antenna.

6. The system of claim 1, wherein the hardware platform further comprises antenna interface hardware to facilitate a coupling of said local antenna to the hardware platform, and wherein said computing device is further configured to cause a transmission of information specifying the position of said local antenna to said target antenna and receives the position of said target antenna.

7. The system of claim 6, wherein said computing device is further configured to cause a transmission of the pointing status of said local antenna to said target antenna.

8. The system of claim 1, wherein the hardware platform further comprises a database accessible by the processor and containing the positions of known satellites in geosynchronous orbit.

9. The system of claim 1, wherein said target antenna is aligned with said local antenna when said first graphical element is aligned with the second graphical element.

10. The system of claim 1, wherein the representation of the first radiation pattern and the second radiation pattern within the graphical user interface are approximations based on the relative positions of the local antenna and the target antenna.

11. The system of claim 1, wherein the graphical user interface further includes a signal strength graphic element, which shows the strength of the strength of a signal received from the target antenna.

12. A system for aligning antennae, comprising:
a computing device,
a GPS receiver configured to determine a geographic location of a local antenna,
a position sensing hardware component disposed at the local antenna to detect a pointing status of the local antenna, including an azimuth and elevation angle of the local antenna;
an imaging device that provides a live video image of local terrain in which said local antenna is situated, the imaging device aligned to provide the live video image along a boresight direction of the local antenna;
a video display device; and
a communication channel which facilitates data communication between the computing device, the video display device, the GPS receiver, the imaging device, and the position sensing hardware component;
wherein the computing device is configured to
access first information comprising the pointing status provided by the position sensing hardware component and the geographic location of the local antenna determined by the GPS receiver,
access second information concerning a geographic location and pointing status of a target antenna associated with a target terminal,
use the first and second information to determine an updated relative bearing and elevation to which the local antenna should be adjusted to become aligned with the target antenna,
use the updated relative bearing and elevation to update the information contained in a graphical user interface, and
cause the graphical user interface to be superimposed on the live video image in the video display device;
wherein the graphical user interface includes a first graphical element comprised of a first radiation pattern of the local antenna and a second graphical element comprised of a second radiation pattern of the target antenna, which graphically illustrate a relative alignment of a main lobe of the first radiation pattern with a main lobe of the second radiation pattern.

13. The system of claim 12, wherein the information in the graphical user interface which is updated includes an indicia which graphically indicates the updated relative bearing and elevation.

14. The system of claim 12, wherein said imaging device is secured to the local antenna or a portion of a support structure for the local antenna aligned with the boresight direction.

15. The system of claim 12, wherein the first radiation pattern and the second radiation pattern included in the graphical user interface are approximations based on the relative positions of the local antenna and the target antenna.

16. A system for aligning antennae, comprising:
a computing device,
a GPS receiver configured to determine a geographic location of a local antenna,
a position sensing hardware component disposed at the local antenna to detect a pointing status of the local antenna, including an azimuth and elevation angle of the local antenna;
an imaging device aligned to provide a live video image along a boresight direction of the local antenna;
a video display device; and
a communication channel which facilitates data communication between the computing device, the video display device, the GPS receiver, and the position sensing hardware component;
wherein the computing device is configured to
access first information comprising the pointing status provided by the position sensing hardware component and the geographic location of the local antenna determined by the GPS receiver,
access second information concerning a geographic location of a target antenna associated with a target terminal,
use the first and second information to determine an relative bearing and elevation to which the local antenna should be adjusted to become aligned with the target antenna;
use the first and second information to generate a graphical user interface which includes a first graphical element comprised of a radiation pattern of the local antenna, and a second graphical element indicating a location of the target antenna;
use the relative bearing and elevation to continually update the graphical user interface during an antenna alignment session to show relative positions of the first and second graphical elements in accordance with a relative alignment of the radiation pattern of the local antenna with the location of the target antenna, and
cause the graphical user interface to be displayed in the video display device superimposed over the live video image;
wherein the graphical user interface is comprised of the first graphical element and the second graphical element, which graphically illustrate a relative alignment of a main lobe of the radiation pattern of the local antenna with the target antenna.

17. The system of claim 16, wherein said computing device is configured to access third information concerning a specific antenna type of the local antenna, and generates the graphical user interface to include a third graphical element, wherein a design of the third graphical element is selectively determined by the computing device so as to correspond to the actual appearance of the specific antenna type.

18. The system of claim 16, wherein the second information further includes a pointing status of the target antenna and the graphical user interface includes a third graphical element comprised of a radiation pattern of the target antenna.

19. The system of claim 18, wherein the radiation pattern of the local antenna and the target antenna as indicated within the graphical user interface are approximations based on the relative positions of the local antenna and the target antenna.

20. A system for aligning antennae, comprising:
a computing device,
a GPS receiver configured to determine a geographic location of a local antenna,
a position sensing hardware component disposed at the local antenna to detect a pointing status of the local antenna, including an azimuth and elevation angle of the local antenna;
an imaging device that provides a live video image of local terrain in which said local antenna is situated, the imaging device aligned to provide the live video image along a boresight direction of the local antenna;

a video display device; and a communication channel which facilitates data communication between the computing device, the video display device, the GPS receiver, and the position sensing hardware component;

wherein the computing device is configured to access first information comprising the pointing status provided by the position sensing hardware component and the geographic location of the local antenna determined by the GPS receiver, access second information concerning a geographic location of a target antenna associated with a target terminal, use the first and second information to determine a relative bearing and elevation to which the local antenna should be adjusted to become aligned with the target antenna, use the relative bearing and elevation to update the information contained in a graphical user interface, and cause the graphical user interface to be displayed in the video display device;

wherein the graphical user interface includes a first graphical element comprised of a radiation pattern of the local antenna, and a second graphical element indicating a location of the target antenna, and wherein the computing device is responsive to a change in the pointing status to update the display of the first and second graphical elements, whereby the graphical user interface graphically illustrates a relative alignment of a main lobe of the radiation pattern of the local antenna with the target antenna as the pointing status of the local antenna is adjusted; and wherein the computing device is configured to cause the graphical user interface to be superimposed on the live video image in the video display device.

* * * * *